No. 816,486. PATENTED MAR. 27, 1906.
G. M. LONG.
RAKE.
APPLICATION FILED MAY 10, 1905. RENEWED FEB. 28, 1906.
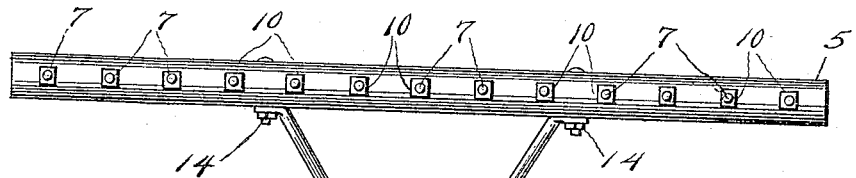
Fig. I
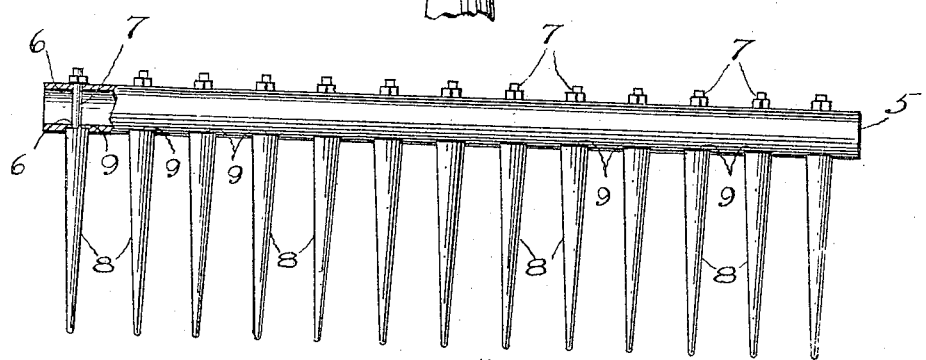
Fig. 2
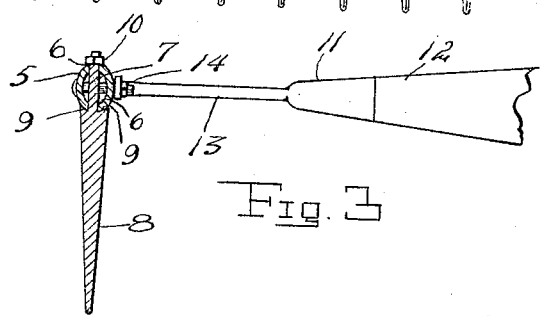
Fig. 3
Witnesses
Inventor
G. M. Long.

UNITED STATES PATENT OFFICE.

GEORGE M. LONG, OF LATROBE, PENNSYLVANIA.

RAKE.

No. 816,486.     Specification of Letters Patent.     Patented March 27, 1906.

Application filed May 10, 1905. Renewed February 28, 1906. Serial No. 303,472.

*To all whom it may concern:*

Be it known that I, GEORGE M. LONG, a citizen of the United States, residing at Latrobe, in the county of Westmoreland, State of Pennsylvania, have invented certain new and useful Improvements in Rakes; and I do hereby declare the following to be a full, clear, and exact description of the invention, such as will enable others skilled in the art to which it appertains to make and use the same.

This invention relates to rakes; and it has for its object to provide as a new article of manufacture a rake which may be made at a reasonable cost, in which the teeth may be easily and quickly attached to or removed from the head, and in which the ferrule may be readily applied and removed, thus enabling a quick assembling of the parts and permitting of substitution of new parts for those that may have become broken.

In the drawings forming a portion of this specification, and in which like numerals of reference indicate similar parts in the several views, Figure 1 is a top plan view of a rake embodying the present invention. Fig. 2 is a vertical section taken longitudinally through the head of the rake with the teeth in elevation. Fig. 3 is a vertical section taken transversely through the head of the rake and one end of an arm of the ferrule.

Referring now to the drawings, the present rake comprises a head consisting of a transversely-elliptical tube 5, through which in the line of its major diameter are formed pairs of registering perforations 6, in which are engaged the stems 7 of the rake-teeth 8. The stems are formed by reducing in diameter the upper end portions of the teeth, so that shoulders 9 are formed that rest against the head 5, the free ends of the stems projecting through the head and being threaded to receive nuts 10, by means of which the teeth are drawn with their shoulders firmly against the head. The shoulders 9 are slightly hollowed out, as illustrated, to conform to the curvature of the head, so that the teeth are held against rotation, and thus their fixed positions are assured.

A ferrule 11 is provided, that receives the handle 12, and from the minor end of the ferrule extend divergingly the arms 13, the extreme end portions of which lie against the rear face of the head 5 and are perforated to receive bolts 14, that hold them to the head.

The entire rake may be made of steel or other suitable metal or metals, and any one or more of the parts may be removed from the head for substitution of other parts, the peculiar engagement of the shoulders of the teeth with the head serving to prevent rotation of the teeth when the nuts are screwed both onto and off from the stems of the teeth, thus facilitating the operation. Furthermore, by engaging the shoulders of the teeth against the end portions of the elliptical cross-section of the rake-head the shoulders may be more deeply concaved to hold them more securely against rotation than if a cylindrical tube of the same cross-sectional area were used.

What is claimed is—

A rake comprising a tubular head elliptical in cross-section and having pairs of alining perforations in the line of its major cross-sectional axis, teeth having reduced upper ends engaged each through a pair of alining perforations of the head with the adjacent curved face of the head in the concavity of its shoulder, said reduced portions projecting above the head and being threaded, the nuts engaging with the reduced portions above the head, a ferrule having diverging arms disposed with their extremities against the head, bolts engaged through the arms and head and a handle engaged in the ferrule.

In testimony whereof I affix my signature in presence of two witnesses.

GEORGE M. LONG.

Witnesses:
   R. P. LONG,
   R. B. WEAVER.